Oct. 3, 1950     J. A. SHAW     2,524,088
GAS PURIFICATION PROCESS
Filed Aug. 17, 1944
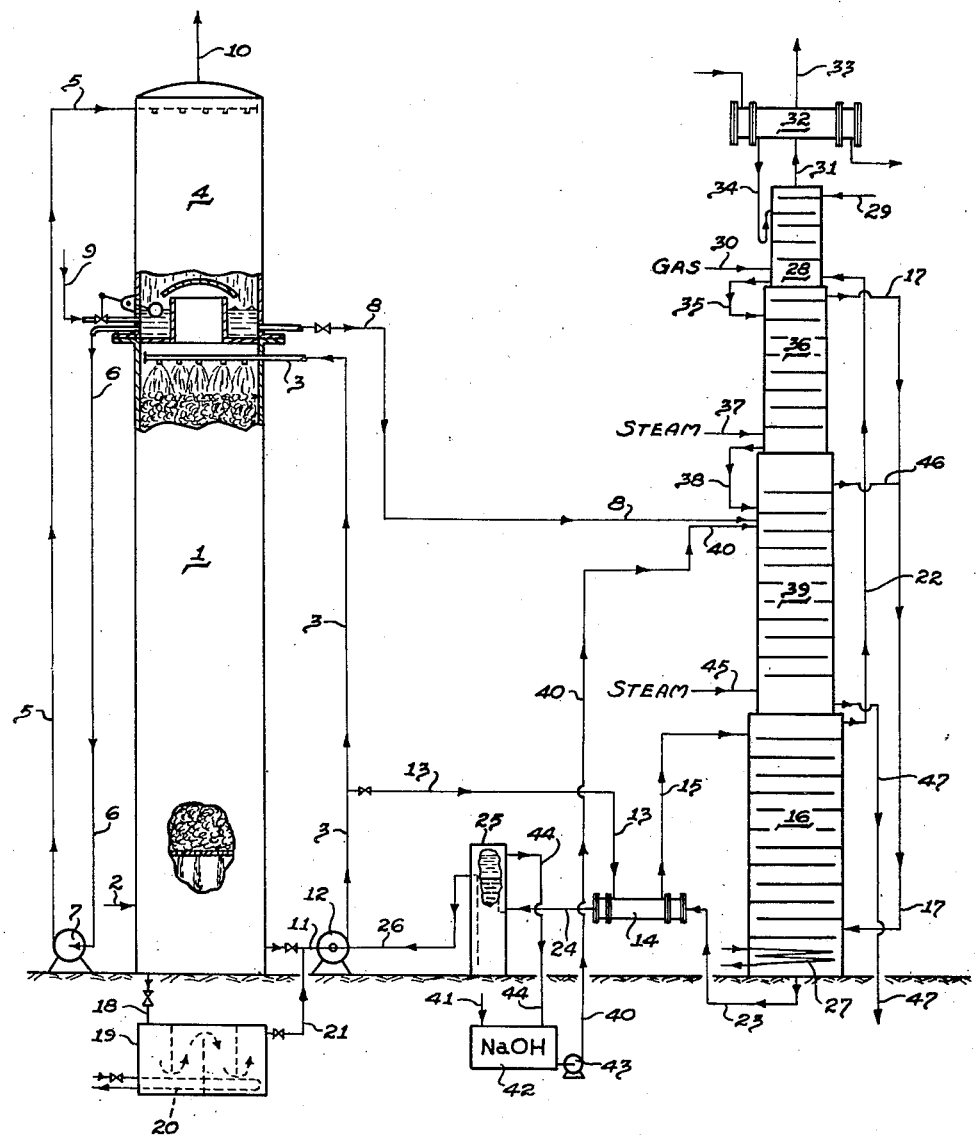
INVENTOR.
JOSEPH A. SHAW
BY Edmund G. Gorley
his ATTORNEY.

Patented Oct. 3, 1950

2,524,088

UNITED STATES PATENT OFFICE 2,524,088

GAS PURIFICATION PROCESS

Joseph A. Shaw, Pittsburgh, Pa., assignor, by mesne assignments, to Koppers Company, Inc., Pittsburgh, Pa., a corporation of Delaware Application August 17, 1944, Serial No. 549,833

15 Claims. (Cl. 23—2)

The present invention relates to a process for the purification of industrial gases.

It is known that suitable absorbents for acidic gases can be selected from the organic nitrogen compounds known as the amines, including primary and secondary forms thereof. The more alkaline-reacting of these amines can be utilized for absorbing organic sulphur compounds from gases, there being consequently formed amine sulphur complex. Usually the absorbent amines are regenerated by means including heat that brings about sulphur elimination. However, the vapor loss of any but the high boiling amines with the volatile sulphur compounds is so excessive as to require separate means for recovery of said lower boiling amines, and the total necessary heat input for operating a cyclic process of sulphur removal and regeneration with lower boiling amines is so high as to render the process uneconomical.

It has now been found that an amine sulphur complex of relatively low boiling amines can be decomposed and the sulphur eliminated without excessive loss of amine if certain types of acid are present when heat is applied to a gas-scrubbing medium containing amine sulphur complex. The novel employment of a said acid with its formation of an amine-acid compound also serves to decrease the loss of amine in the purified gas during the scrubbing step.

A primary object of the present invention is to provide an improved process for the purification of industrial gas by the removal therefrom of sulphur compounds and more especially the removal of organic sulphur compounds, such as carbon disulphide, carbonyl sulphide and mercaptans.

A further object of the present invention is to provide process and apparatus for continuously revivifying amine-containing purification media employed in a gas purification process without excessive loss of amines.

Another object of invention is to provide an improved process and apparatus for employing secondary amines such as piperidine, morpholine, their homologues and mixtures of hydrogenated tar bases, in the continuous removal from industrial gases of organic sulphur compounds and for the subsequent recovery of reagent for reuse.

Yet another object of invention is to provide an improved process for sulphur removal from gases that can efficiently utilize high concentrations of amines having relatively low boiling points.

The invention has for further objects such other improvements and such other operative advantages or results as may be found to obtain in the processes or apparatus hereinafter described and claimed.

In the accompanying drawing forming a part of this specification there is shown for purposes of exemplification a preferred form of apparatus and a process in which the invention may be embodied and practiced but without limiting the claimed invention specifically to such illustrative instance or instances: the single figure shows a diagrammatic flow sheet partly in elevation and partly in vertical section of apparatus for carrying out the improvement provided by the present invention.

In connection with the description of the apparatus, there will be given an example of the results obtainable in the practice of the invention using piperidine and phenol dissolved in refined creosote oil as a scrubbing medium.

Referring to the drawing, the purification of the gas takes place in scrubber 1, which is the well known packed tower. A stream of coke-oven gas flowing at a rate of about 1000 cubic feet per hour from a light oil recovery plant, enters scrubber 1 through line 2 located near the bottom thereof and passes upwardly countercurrent to a descending flow of scrubbing medium, comprising a refined creosote oil that contains about 33 grams per liter of piperidine and about 37 grams per liter of phenol, a molar ratio of about 1 to 1. This scrubbing medium absorbs and reacts with sulphur compounds in the gas especially with organic sulphur compounds such as carbon disulphide, carbonyl sulphide, carbon hydrogen sulphide, mercaptans, and the like, each 100 cubic feet of gas containing about 8 grains of these organic sulphur compounds. The piperidine forms a sulphur complex with these organic sulphur compounds and during this scrubbing step there is an increase in the uncombined phenol content of the scrubbing medium. The scrubbing medium enters scrubber 1 through line 3 at the rate of about 10 gallons per 1000 cubic feet gas scrubbed. The gas passing through the packed tower 1 contains traces of piperidine vapors and enters scrubber 4 located thereabove and passes upwardly countercurrent to a descending stream of water. Scrubber 4 is similar in construction to scrubber 1 but usually smaller in size and serves to remove traces of piperidine vapor from the purified gas. As the gas also contains about 1.9% carbon dioxide by volume the piperidine and carbon dioxide combine to form piperidine carbonate solution. Where carbon dioxide is not present in the gas, or alternatively in place of water, there can be used hydrochloric acid or sulphuric acid solutions or a solution of a salt of a strong acid and weak base such as a solution of ammonium sulphate. The water flowing at the rate of ten gallons per 1000 cubic feet of gas scrubbed enters scrubber 4 through line 5. The piperidine carbonate is very soluble and exhibits a low partial pressure of piperidine from its solution. This fact permits employment of a recirculation system, the piperidine carbonate solution flowing from the bottom of scrubber 4 through line 6 to pump 7 which then returns the same to the scrubber through line 5. For every thousand cubic feet of gas scrubbed about 0.13 gallon of this solution is continuously by-passed through valved line 8 to recovery means for piperidine hereinafter to be described. Make-up water or fresh solution enters scrubber 4 through controller regulated line 9. The purified gas leaves scrubber 4 through line 10 with its organic sulphur content reduced from 8 grains to 0.49 grain per 100 cubic feet, a removal of 94%.

For organic sulphur removal from gases the scrubbing medium generally comprises an amine or amines in a solvent diluent or carrier. Primary and secondary amines can be employed and secondary amines are especially useful because of their efficient absorption of sulphur compounds and the ease with which they can be recovered for reuse. Such secondary amines are in addition to piperidine and its homologues, morpholine and its homologues. There can also be employed a hydrogenated tar base fraction prepared from a fraction originally including pyridine, quinoline, isoquinoline, and their homologues and isomers. The hydrogenated portion of a tar base from which any unhydrogenated constituents have been separated can be used in admixture without any further purification as an efficient absorption agent. The useful hydrogenated tar base fraction can comprise many compounds which have a wide range of boiling points, for example, piperidines, pipecolines, lupetidines, copellidines, tetramethyl piperidines, tetrahydro-, decahydro- and hexahydro-derivatives of quinoline and isoquinoline.

These amines, valuable for organic sulphur removal, must be recovered in an economical manner else the process would not be commercially feasible. Loss of amine with the gas increases with amine concentration in scrubbing medium and increases the recovery costs in scrubber 4. On the other hand, the hereinafter described revivification process for removal of amine sulphur complex becomes more economical the greater the amine sulphur complex concentration, which consequently requires a correspondingly high amine concentration in the scrubbing medium. The use of a weak acid reacting compound which when admixed with an amine containing scrubbing medium can form a soluble amine-weak acid reaction product or compound therein, serves to decrease the amine loss with the gas even at high amine concentration, since the amine-weak acid product has a much lower vapor pressure than that of amine alone. Thus, in the described example where phenol is the weak acid reacting compound the piperidine concentration in the creosote oil is between 3 and 5 times the piperidine concentrations employed according to the prior art. Among the weak acid reacting compounds that can be employed are the phenols, hydroquinone and alanine as well as inorganic acids, for example, boric acid, that have dissociation constants small enough to allow their displacement by organic sulphur compounds from the amine-weak acid reaction product. A preferred molar ratio of amine to weak acid reacting compound in scrubbing medium is about 1:1. This ratio always assures sufficient weak acid reacting compound to combine with and thus reduce vapor losses of any free amine, although it is obvious that less weak acid reacting compound can be employed with increase in amine sulphur complex concentration in the cyclic system. A greater phenol to creosote oil ratio is neither detrimental nor does it give improved operating results and a great excess thereof can increase recovery costs.

The solvent diluent or scrubbing medium is a solvent for the amines, for the amine-weak acid reaction product and for the amine sulphur complex. The scrubbing medium preferably should have a relatively low vapor pressure, thus preventing undue vapor losses to the purified gas. The scrubbing medium may be hydrocarbon oils, which are cyclic hydrocarbons and specifically mineral and coal tar oils. The coal tar oils, such as the creosotes are preferred because they are excellent solvents for the amine sulphur complex and because for economical operation the scrubbing medium is recirculated to maintain a high amine sulphur complex concentration. Usually, the complex is not concentrated to the point where it separates as a suspension in the medium, since a suspension can plug or produce undesirable channeling in the gas scrubber.

Scrubbing medium separated from the gas in scrubber 1 flows therefrom through valved line 11 and by means of pump 12 and line 3 is recycled into contact with to-be-purified gas until the medium contains about 8 grams per liter of organic sulphur calculated as carbon disulphide when about 0.64 gallon thereof for every 1000 cubic feet of gas scrubbed is continuously by-passed through valved line 13, heat exchanger 14 and line 15 to a bubble cap type still section 16 wherein the medium flows downwardly in countercurrent to upflowing steam obtained from another process step and admitted to still 16 through line 17. Alternatively, all or a portion of the scrubbing medium from scrubber 1 can flow through a valved line 18 to and through baffled delay tank 19, equipped with a heating coil 20 to warm the scrubbing medium where required. A major portion of the organic sulphur compounds are combined as an amine sulphur complex, the remainder being dissolved in the creosote oil. In delay tank 19, opportunity is given for these dissolved sulphur compounds in the creosote oil to react with amine and form additional amine sulphur complex. Progress of the reaction to completion and thus the time for passage through the delay tank can be judged by empirical determinations of decreasing total vapor pressure of uncombined sulphur compounds in the scrubbing medium. From tank 19 the medium flows through a valved line 21 to pump 12 for recirculation and for revivification. Delay tank 19 is of particular value when amines of lesser alkalinity than piperidine are used.

The heat in the steam flowing from line 17 to the still 16 in conjunction with the acidic action of the phenol in the piperidine-phenol mixture releases relatively volatile organic sulphur compounds from the piperidine sulphur complex and then sweeps the released organic sulphur from still 16 to line 22. While at the lower gas scrubbing temperature in scrubber 1, the phenol does not interfere with removal of organic sulphur from the gas as evidenced by the 94% removal thereof, yet at the elevated revivification temperature in still 16, the phenol aids in decomposing the piperidine sulphur complex. Only a minor portion of free piperidine is swept out of still 16 with the sulphur compounds, because of the presence of the phenol that immediately forms a compound with piperidine. While the organic sulphur content of the so-treated scrubbing medium portion can be substantially completely removed, it has been found from a study of vapor pressure relationships that it is more economical to treat a relatively large volume of scrubbing medium and only remove a portion of its organic sulphur content rather than to treat a relatively small volume of said medium and remove a correspondingly greater portion of its organic sulphur. In the present example the scrubbing medium has its sulphur content reduced from 8 to 6 grams per liter in still 16. In any case, empirical determinations of temperature, concentration, solubility and vapor pressure relationships for any groups of employed materials can be a guide for most efficient operation.

As hereinafter described, the steam from line 17 used to remove sulphur compounds from scrubbing medium in still 16 contains piperidine and phenol recovered in the later process steps. Thus, in still 16 the piperidine, phenol, and compound thereof are again dissolved in the scrubbing medium thereby building up its content of these materials to the level required for gas scrubbing, as well as removing therefrom approximately all the sulphur compounds scrubbed from the gas stream during one recycling of the scrubbing medium. The treated scrubbing medium portion leaves still 16 through line 23, gives up a portion of its heat content in heat exchanger 14 to incoming scrubbing medium, passes therefrom through line 24 to a water separator 25, and after separation of any water it may contain, flows to the inlet of pump 12 through line 26 and is recirculated to scrubber 1. Steam coil 27 located near the bottom of still 16 can be employed to break up possible oil-water emulsions, and can also supply sufficient heat to prevent any water condensation in the scrubbing medium portion leaving still 16 through line 23. In case no water reaches the bottom of still 16 it is possible to operate without water separator 25.

Sweep steam which leaves the still 16 through the line 22 contains organic sulphur compounds and minor portions of piperidine and phenol. This steam flows to and upwardly through still 28 countercurrent to a downflowing solution of an acid-reactant material admitted through line 29, such as a solution of an acid or salt of a weak base and strong acid, for example, ammonium sulphate that forms a salt with piperidine. An appreciable saving in heat can be effected by admitting an inert gas, for example coke-oven gas, through line 30 concurrently with said sweep steam to assist the steam in carrying away organic sulphur at an appreciably lower temperature, thereby also reducing to a minimum the phenol loss. In the present example, for every 1000 cubic feet of gas scrubbed there were used for these purposes 0.023 gallon 5% ammonium sulphate solution and 0.05 cubic foot purified coke-oven gas. Vapors leaving still 28 through line 31 enter dephlegmator 32, where the organic sulphur and inert gas are separated and vented therefrom through line 33, while condensate containing phenol flows back to the still 28 through a line 34.

A piperidine salt solution leaves the bottom of still 28 through a line 35 and enters the top of still 36 and flows down therethrough countercurrent to upflowing direct steam admitted through a line 37. The steam serves to sweep from the piperidine sulphate solution its phenol content, the admixture of phenol and steam then flowing to the bottom of still 16 through line 17. The piperidine sulphate solution flows from the bottom of still 36 through line 38 to the top of still 39 and is therein mixed with a piperidine carbonate solution, flowing thereto through valved line 8 from scrubber 4. The mixture is treated with a relatively strong base, for example, caustic soda or lime entering from line 40. The strong base separates free piperidine from its salts while forming inorganic salts of respective base and acid. The caustic soda is supplied through line 41 to sump 42 and is passed through a line 40 to the top of still 39 by means of pump 43. Where a water separator 25 is employed, it is economical to return piperidine to the cyclic system by flowing piperidine-containing water from separator 25 through a line 44 to sump 42. The free piperidine and inorganic salt flows downwardly through still 39 countercurrent to upflowing direct steam admitted through line 45, the steam sweeping free piperidine from the still through line 46, while the inorganic salt solution is removed through line 47. Sweep steam from still 39 passes through line 46 into line 17 containing sweep steam with phenol and the mixture is then flowed through line 17 to still 16. This steam passes upwardly through still 16, as hereinabove described to build up the piperidine and phenol content of the scrubbing medium and to separate therefrom the organic sulphur and carry it to still 28. In the present example for recovery of phenol and piperidine there was used for every 1000 cubic feet of gas scrubbed about 0.4 lb. free steam in still 36 and about 0.25 lb. steam in still 39, the combined steam therefrom being sufficient to bring about the changes hereinabove described in still 16.

The illustrated still 36 can be omitted in those instances where it is not preferred to recover employed phenol. In such a case salt solution from the bottom of still 28 would flow to the top of still 39 wherein the phenol then forms a salt with the caustic soda employed in still 39 and is disposed of with the inorganic salt through line 47. Where still 36 is not employed, sufficient make-up weak acid can also be added to the system, for example, at some point in line 23 (not shown) to maintain its required concentration in the process system.

In general, the method of recovery for amines from their salts will depend largely on physical characteristics and more especially on relationships existing between boiling point, solubility and partial pressure. An amine salt can be treated with a relatively strong base that liberates amine with formation of an inorganic salt. The so-liberated amine can be recovered from co-formed salt by a salting-out process or by heat means applied thereto directly or indirectly or in combination. In a heating method and depending on such factors as its boiling point, solubility in water, and partial pressure, an amine can be obtained in concentrated form from the bottom of a still. The so-produced concentrate can thereafter be salted out for recovery of the amine or said concentrate can be brought into contact with a scrubbing medium portion and amine dissolved therefrom by said scrubbing medium according to an established partition coefficient. In any event, so-recovered amine is recycled to the main body of scrubbing medium at some point before it again comes into contact with to-be-purified gas. Steam is usually preferred for supplying heat and sweep vapor in the stills, although other well-known commercial materials such as Dowtherm or even inert gases, where available, can be employed.

The hereinabove described novel process for the removal of organic sulphur can likewise be employed for the removal of inorganic sulphur such as hydrogen sulphide from gases. For example, with piperidine there is formed piperidine hydrosulphide that is quite soluble in cyclic hydrocarbons and the employment of the latter as as scrubbing medium largely eliminates the interference of carbon dioxide, where such a gas as coke-oven gas is scrubbed. The volume of steam required as hereinabove described increases only slightly with an increase in concentration of sulphur in the gas thus resulting in a relatively economical removal process. The concentration of hydrogen sulphide, or the like, in a to-be-purified gas will be an important factor in determining size of equipment and the necessary quantity of chemicals required in said process.

Cross reference is made to applicant's copending applications Serial No. 549,832 issued as Patent 2,395,509, Feb. 26, 1946, and Serial No. 544,420 issued as Patent 2,490,840, Dec. 13, 1940. These applications broadly involve the use of amines for the removal of sulphur compounds from fluids.

The invention as hereinabove set forth is embodied in particular form and manner but may be variously embodied within the scope of the claims hereinafter made.

I claim:

1. A process for removing organic sulphur compounds from gas, comprising: scrubbing said gas with a medium comprising amine, phenol, and a compound thereof dissolved in a hydrocarbon oil to absorb organic sulphur compounds from said gas and to form amine sulphur complex therewith; in a second scrubbing step flowing so-purified gas into contact with an acidic-reactant solution to form an amine salt with amine removed by the gas from said medium; separating scrubbing medium from contact with said gas in the first scrubbing step and recycling a portion thereof to said scrubbing step; heating the remaining portion of scrubbing medium with sweep vapor containing steam amine and phenol obtained from a later process step to strip out sulphur compounds and amine sulphur complex and to build up the amine and phenol content of the scrubbing medium; recycling the reformed medium to the gas-scrubbing step; treating sweep vapor together with the sulphur compounds stripped from the medium with an acidic solution to form amine salt solution and thereafter cooling said vapor by indirect means to condense phenol therefrom and venting the remaining sweep vapor containing organic sulphur compounds from the process; removing phenol from the said solution with steam; admixing remaining solution with scrubbing medium from the second gas-scrubbing step and treating the admixture with a relatively strong base to release amine from its salts; distilling so-released amine from said admixture with steam; combining the phenol and amine-containing steam and utilizing the vapor mixture to revivify scrubbing medium as hereinabove described.

2. A process for removing organic sulphur compounds from gas containing the same, said process comprising: scrubbing said gas with a medium comprising piperidine and phenol dissolved in a cyclic hydrocarbon medium to absorb organic sulphur compounds from said gas and to form piperidine sulphur complex therewith; in a second scrubbing step flowing so-purified gas into contact with a solution of ammonium sulphate and forming piperidine sulphate with volatilized piperidine; separating scrubbing medium from contact with gas in said first scrubbing step and recycling a portion of said srubbing medium to said scrubbing step; passing the remainder of said scrubbing medium countercurrent to sweep steam containing piperidine and phenol obtained from a later process step to drive out of the medium volatile sulphur compounds including the piperidine sulphur complex, and to build up the piperidine and phenol content of the scrubbing medium to a preferred level; recycling revivified scrubbing medium to the first gas-scrubbing step; passing an admixture of an inert gas and sweep steam containing volatilized organic sulphur compounds countercurrent to ammonium sulphate solution to dissolve out piperidine as piperidine sulphate while cooling the admixture sufficiently to condense its content of phenol, and venting inert gas, steam and organic sulphur vapors from the system; passing sweep steam through the combined solutions containing phenol and piperidine sulphate to sweep out phenol; admixing remaining piperidine sulphate and piperidine sulphate from the second scrubbing step with sodium hydroxide and sweeping so-produced free piperidine from the solution with steam; combining phenol-bearing and piperidine-bearing steam and using the mixture as a sweep vapor for treatment of the scrubbing medium from the first scrubbing step by building up the phenol and piperidine content thereof to a preferred level and removing therefrom a preferred quantity of its organic sulphur compounds.

3. A process for removing organic sulphur compounds from coke-oven gas also containing carbon dioxide, comprising: scrubbing coke-oven gas with a medium comprising piperidine and phenol in equimolecular ratio dissolved in a refined creasote oil medium to absorb organic sulphur compounds from said gas and to form piperidine sulphur complex therewith; in a second scrubbing step flowing said purified gas into contact with water to form piperidine carbonate with volatilized piperidine absorbed in the gas and carbon dioxide in the gas; recycling a portion of said scrubbing medium to the second gas scrubbing step and removing piperidine from the remainder in a later process step; separating the scrubbing medium from contact with gas in said first scrubbing step and recycling a portion of said scrubbing medium to said scrubbing step; passing the remainder of said scrubbing medium countercurrent to sweep steam containing piperidine and phenol obtained from a later process step to drive out volatile sulphur compounds and piperidine sulphur complex and to build up the piperidine and phenol content of the scrubbing medium to a preferred level; recycling revivified scrubbing medium to the first gas scrubbing step; passing a mixture of purified coke-oven gas and said sweep steam containing volatilized organic sulphur compounds firstly countercurrent to an ammonium sulphate solution to dissolve out piperidine as piperidine sulphate and cooling the admixture sufficiently to condense its content of phenol, the remaining coke-oven gas, steam and organic sulphur vapors being then vented from the system; passing sweep steam through the combined solutions containing phenol and piperidine sulphate to sweep out the phenol; admixing remaining piperidine sulphate and piperidine carbonate from the second scrubbing step with sodium hydroxide and sweeping the free piperidine from the solution with steam; and combining phenol-bearing and piperidine-bearing steam and using the mixture as a sweep medium in treating the scrubbing medium from the first scrubbing step and to build up the piperidine and phenol content thereof to a preferred level and removing therefrom a portion of its organic sulphur content.

4. A process for removing organic sulphur compounds from gas comprising: scrubbing said gas with a medium comprising amine, phenol and a compound thereof dissolved in a hydrocarbon oil to absorb organic sulphur compounds from said gas and to form amine sulphur complex therewith, in a second scrubbing step flowing so-purified gas into contact with an acid reacting solution to remove from the gas volatilized amine absorbed by said gas in the first scrubbing step to form amine salt with the acid reacting constituent, separating scrubbing medium from the first scrubbing step and recycling a portion thereof to said scrubbing step, heating the remaining portion of the scrubbing medium with hot vapors obtained from a later scrubbing step to strip sulphur compounds, amine sulphur complex and some phenol and amine out of the medium to reform it to a predetermined amine and phenol content preparatory to the gas scrubbing step, contacting the separated and volatilized organic sulphur compounds with an acid reacting solution and steam to form a salt from the amine and the acid reacting constituent, combining the so-produced salt with the amine salt formed in the second scrubbing step and treating the mixture of salts to release free amine therefrom, steam distilling the amine from the solution and utilizing the hot vapors of the distillation to reform scrubbing medium as referred to above.

5. A process of removing organic sulphur compounds from gas comprising: scrubbing the gas with a medium composed of piperidine and phenol dissolved in a hydrocarbon oil, stripping sulphur compounds and piperidine vapors out of the rich medium to reform the medium, treating the stripped vapors with an acid reacting salt to absorb piperidine and to condense phenol therein while permitting sulphur vapors to escape from the system, stripping the phenol out of the salt solution with steam, treating the stripped salt solution with a strong base while steaming to separate piperidine therefrom, combining the phenol and piperidine together with the stripping steam and using the vapor mixture for reforming said medium, and returning the reformed medium to the gas absorbing step.

6. A process of removing organic sulphur compounds from gas comprising: scrubbing the gas with a medium composed of piperidine and phenol dissolved in a hydrocarbon oil, stripping sulphur compounds and piperidine vapors out of the rich medium, treating the stripped vapors with an acid reacting salt to absorb the piperidine and set free the sulphur vapors, treating the salt solution containing the piperidine with a base to separate the piperidine and stripping the piperidine separated from the solution of the rich medium for reforming it, and returning the reformed medium to the gas absorbing step.

7. The process defined in claim 6 in which the phenol and piperidine are dissolved in the hydrocarbon oil in equimolar proportions.

8. The process defined in claim 6 in which the phenol and piperidine each constitute approximately three percent of the absorbing medium.

9. The process defined in claim 6 in which the hydrocarbon oil is creasote oil.

10. The process defined in claim 6 in which phenol is stripped from the rich medium along with piperidine and sulphur compounds and condensed by cooling in the salt treating solution, thereafter the phenol is stripped from the salt solution by steaming and returned to the rich medium reforming step along with steam.

11. The process defined in claim 6 in which coke oven gas containing organic sulphur compounds and carbon dioxide is refined and the gas after passing the absorbing menstruum is passed through a body of water to absorb any piperidine removed from the menstruum and to form a piperidine carbonate by reaction of the piperidine with the carbon dioxide in the gas, and thereafter the piperidine carbonate is blended with the piperidine salt formed by treating piperidine vapors with an acid reacting salt whereby the piperidine will be recovered to be added to the medium in the reforming stage.

12. The process defined in claim 6 in which the acid reacting salt to absorb the piperidine is ammonium sulphate.

13. The process defined in claim 12 in which the piperidine sulphate formed is treated with sodium hydroxide to set free piperidine.

14. The process defined in claim 6 in which an amount of absorbing medium in excess above that necessary for absorbing the organic sulphur in the gas is circulated in a closed cycle between the gas scrubbing stage and the rich medium reforming step, and a minor portion of the sulphur compounds in the rich medium is removed before it is returned to the gas absorption step.

15. The process defined in claim 14 in which the volume of sulphur compounds stripped from the rich medium in a given period of time is equal to the volume of sulphur compounds absorbed from the gas in the same period of time.

JOSEPH A. SHAW.

REFERENCES CITED

The following references are of record in the file of this patent:

UNITED STATES PATENTS

| Number | Name | Date |
| --- | --- | --- |
| 2,161,663 | Baehr et al. | June 6, 1939 |
| 2,163,169 | Gollmar | June 20, 1939 |
| 2,177,068 | Hutchinson | Oct. 24, 1939 |

OTHER REFERENCES

Babar and Lehrman, "General College Chemistry," p. 426, 2d ed., Crowell Co., N. Y., 1940.